United States Patent [19]

Connelly et al.

[11] Patent Number: 4,879,345

[45] Date of Patent: Nov. 7, 1989

[54] FLUOROPOLYMER BASED COATING COMPOSITION FOR ADHESION DIRECT TO GLASS

[75] Inventors: Bruce A. Connelly, Gibsonia; Matthew E. Wehrle, New Kensington; Paul P. Greigger, Allison Park, all of Pa.

[73] Assignee: PPG Industries, Inc., Pittsburgh, Pa.

[21] Appl. No.: 224,837

[22] Filed: Jul. 27, 1988

[51] Int. Cl.$^4$ ............................................. C08F 8/00
[52] U.S. Cl. .................................. 525/104; 525/107; 525/118; 525/121; 525/122; 525/288; 525/193; 524/296; 524/306
[58] Field of Search ............... 525/118, 121, 122, 107, 525/288, 104, 193; 524/296, 306

[56] References Cited

U.S. PATENT DOCUMENTS

| | | | |
|---|---|---|---|
| 4,297,447 | 10/1981 | Yasuda | 525/133 |
| 4,314,004 | 2/1982 | Stoneberg | 428/421 |
| 4,339,553 | 7/1982 | Yoshimura et al. | 524/544 |
| 4,379,885 | 4/1983 | Miller et al. | 525/108 |
| 4,465,547 | 8/1984 | Belke, Jr. et al. | 156/629 |
| 4,495,247 | 1/1985 | Vasta | 428/422 |
| 4,503,179 | 3/1985 | Yoshimura et al. | 524/262 |
| 4,701,508 | 10/1987 | Homma et al. | 526/249 |

FOREIGN PATENT DOCUMENTS

| | | |
|---|---|---|
| 2217375 | 11/1973 | Fed. Rep. of Germany . |
| 47-18346 | 5/1972 | Japan . |
| 58-50941 | 11/1983 | Japan . |
| 62-260868 | 11/1987 | Japan . |

OTHER PUBLICATIONS

Product literature by Union Carbide concerning Union Carbide organofunctional silanes.

Walker, "Organosilanes as Adhesion Promoters for Organic Coatings", *Journal of Coatings Technology*, vol. 52, No. 670, Nov. 1980, pp. 49 to 61.

Plueddemann, "Coupling Agents, Primers and Additives for Adhesion", *Proceedings of the ACS Division of Polymeric Materials, Science and Engineering*, American Chemical Society, vol. 50, 187th National Meeting, St. Louis, MO, Apr. 8–13, 1984.

N. I. Morozova et al., The Institute of Physical Chemistry of the Academy of Sciences, USSR, "Improving the Adhesive Strength of Naturally Drying Fluoroplastic Coatings".

*Primary Examiner*—Melvyn I. Marquis
*Attorney, Agent, or Firm*—Linda Pingitore

[57] ABSTRACT

A coating composition, containing a fluoropolymer, a film-forming adjuvant resin which is different from the fluoropolymer and adapted to react with the group represented by F in the functional organosilane of formula I and which is selected from the group consisting of acrylic resins, polyepoxide resins, polyester resins, aminoplast resins and mixtures thereof; and an amount effective to promote adhesion of a functional organosilane represented by formula I:

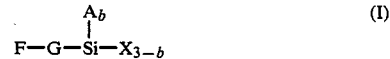

wherein
A represents an organo group containing from 1 to 18 carbon atoms,
G represents an organo group containing from 2 to 10 carbon atoms,
X represents a hydrolyzable group; and
b is an integer from 0 to 2, and
F represents amino, polyamino, glycidoxy, mercapto, cyano, allyl, vinyl, urethano, halo, isocyanato, ureido, imidazolinyl, acrylato or methacrylato.

30 Claims, No Drawings

FLUOROPOLYMER BASED COATING COMPOSITION FOR ADHESION DIRECT TO GLASS

BACKGROUND OF THE INVENTION

The present invention relates to fluoropolymer based coating compositions.

Because of their excellent weathering properties including gloss retention, color retention, water resistance as well as craze and chalk resistance, the use of fluoropolymer based coating compositions is particularly desirable for use over a variety of substrates. For some substrates such as glass, however, the adhesion of the fluoropolymer based coating composition is not as great as desired for the particular application. It is often necessary to utilize some type of adhesive composition in order to obtain the requisite adhesion of a coating composition to the glass substrate. If one is desirous of increasing the adhesion of the coating composition without use of such materials, it may be necessary to carry out costly and time-consuming glass treatments such as etching of the surface in order to improve adhesion.

There is a need, therefore, for a fluoropolymer based coating composition which exhibits all of the desirable properties associated with fluoropolymers and in addition has excellent adhesion direct to glass without the necessity of utilizing adhesive materials and/or treatments to the glass substrate surface.

SUMMARY OF THE INVENTION

In accordance with the present invention, there is provided a coating composition, comprising a fluoropolymer, a film-forming adjuvant resin which is different from the fluoropolymer and adapted to react with the group represented by F in the functional organosilane of formula I; and an amount effective to promote adhesion of a functional organosilane represented by formula I and which is selected from the group consisting of acrylic resins, polyepoxide resins, polyester resins, aminoplast resins and mixtures thereof:

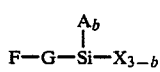   (I)

wherein G represents an organo group containing from 2 to 10 carbon atoms, A represents an organo group containing from 1 to 18 carbon atoms, X represents a hydrolyzable group, F represents amino, polyamino, epoxy, glycidoxy, mercapto, cyano, allyl, vinyl, urethano, halo, isocyanato, ureido, imidazolinyl, acrylato or methacrylato; and b is an integer from 0 to 2.

Also provided in accordance with the present invention is a method of forming a decorative coating on a glass substrate comprising:
 (a) applying to the glass substrate a coating composition as has been detailed immediately above; and
 (b) allowing the coating composition to cure.

DETAILED DESCRIPTION OF THE INVENTION

The coating composition of the present invention comprises as its principal constituents a fluoropolymer, a functional organosilane, and a film-forming adjuvant resin.

Several different film forming fluoropolymers are useful in the present invention. Such resins include the polyvinyl fluorides, polyvinylidene fluorides, vinyl fluoride copolymers, and vinylidene fluoride copolymers. The preferred film-forming fluoropolymer is polyvinylidene fluoride. The copolymers preferably include at least 75 percent by weight, more preferably 90 percent or more of vinyl or vinylidene fluoride units. Examples of monomers to be copolymerized with vinyl fluoride or vinylidene fluoride are ethylene, propylene, isobutylene, styrene, vinyl chloride, vinylidene chloride, difluorochlorotthylene, tetrafluoroethylene, trifluoropropylene, hexafluoropropylene, vinyl formate, vinyl acetate, vinyl propionate, vinyl butyrate, acrylic acid and its salts, methyl methacrylate, allyl methacrylate, acrylonitrile, methacrylonitrile, N-butoxymethyl acrylamide, allyl acetate and isopropenyl acetate. In addition fluoropolymers which contain functional groups such as those commercially available from ICI Americas, Inc. under the trade designation LUMIFLON are also suitable for use herein. Generally, the amount of fluoropolymer in the claimed compositions ranges from about 5 percent to about 95 percent by weight, preferably from about 30 percent to about 80 percent by weight, more preferably from about 50 to about 70 percent by weight, the percentages based on the total weight of the resinous components of the composition.

As used herein, functional organosilane is intended to include materials corresponding to the formula

   (I)

wherein G represents an organo group containing from 3 to 10 carbon atoms, A represents an organo group containing from 1 to 18 carbon atoms. X represents a hydrolyzable group, b is an integer from 0 to 2, and F represents amino, polyamino, epoxy, glycidoxy, mercapto, cyano, allyl, vinyl, urethano, halo, isocyanato, ureido, imidazolinyl, acrylato or methacrylato. Exemplary of the hydrolyzable group, X, are

the monohydroxy and/or cyclic $C_2$–$C_3$ residue of a 1,2- or 1,3-glycol, wherein
 $R_1$ represents $C_1$–$C_3$ alkyl,
 $R_2$ independently represents H or $C_1$–$C_4$ alkyl,
 $R_3$ and $R_4$ independently represent H, $C_1$–$C_4$ alkyl, $C_6$–$C_8$ aryl, and
 $R^5$ represents $C_4$–$C_7$ alkylene.

It should be understood that in the present application the term "functional organosilane" also includes materials derived by reacting together two or more of the functional organosilanes defined above either through the functional groups represented by F, above, or through the silane groups or both. One example of such a material is that prepared by reacting one mole of gamma-aminopropyltriethoxy silane with one mole of gamma-glycidoxypropyltrimethoxy silane. Moreover, the term "functional organosilane" also includes materials which are prepared by bridging together two or more functional organosilanes with a material having groups capable of reacting with the functional groups present on the functional organosilanes. One example of such a material is that prepared by bridging together two moles of gamma-aminopropyltriethoxy silane with one mole of a diglycidyl ether of bisphenol A.

It should further be understood that also contemplated to be within the scope of the present invention are coating compositions wherein a single material is the source of more than one of the components of the composition. For example a single material can provide both the adjuvant resin and also the functional organosilane. An example of this type of material is a silane functional acrylic polymer.

Examples of suitable functional organosilanes include glycidoxypropylmethyl-diisopropanoxysilane, 3-aminopropyldimethylethoxysilane, gamma-aminopropyltrimethoxysilane, gamma-aminopropyltriethoxysilane, beta-aminoethyltrimethoxysilane, beta-aminoethyltriethoxysilane, N-beta-aminoethylaminopropyltrimethoxysilane, gamma-isocyanatopropyltriethoxysilane, vinyltrimethoxysilane, vinyl-triethoxysilane, allyl-trimethoxysilane, allyl-triethoxysilane, mercaptopropyltrimethoxysilane, mercaptoethyltriethoxysilane, mercaptopropyltriethoxysilane, glycidoxypropyltrimethoxysilane, glycidoxypropyltriethoxysilane, 4,5-epoxycyclohexylethyltrimethoxysilane, ureidopropyltrimethoxysilane, ureidopropyltriethoxysilane, chloropropyltrimethoxysilane, chloropropyltriethoxysilane and

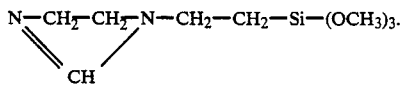

It will be appreciated that functional organosilanes containing mutually reactive functional groups such as epoxy and amino, or amino and isocyanato, etc., or groups defined by F above which are reactive with groups defined by X above, should be employed in controlled amounts so as to avoid gelation or products of undesirably high viscosity. Although partial hydrolysis products can be used herein the unhydrolyzed materials are preferred.

The functional organosilane is present in the claimed coating composition in an amount effective to promote adhesion to a substrate, preferably a glass substrate. The functional organosilane is generally present in an amount of at least 0.1 percent, preferably at least 2 percent based on resin solids. Generally the functional organosilane is present in an amount ranging from about 0.1 percent to about 15 percent based on resin solids, preferably from about 1.5 to about 5 percent and more preferably from about 3 to about 5 percent.

The adjuvant resin of the claimed coating composition is a film-forming resin which is different from the fluoropolymer and adapted to react with the group represented by F in formula I, above, for the functional organosilane. The particular adjuvant resin chosen depends upon the properties which are desired in modifying the fluoropolymer. Mixture as of adjuvant resins can also be utilized. For example, in one embodiment of the claimed coating composition the adjuvant resin is a mixture of an acrylic resin, preferably a thermoplastic acrylic resin, and a positive amount up to about 15 percent by weight based on resin solids of a polyepoxide resin. In this embodiment, the fluoropolymer is typically present in an amount of from about 50 to about 70 percent, the acrylic adjuvant resin is typically present in an amount of from about 10 to about 40 percent, and the polyepoxide adjuvant resin is typically present in an amount from about 5 to about 15 percent, the percentages based on resin solids.

It should be understood that for certain adjuvant resins a crosslinking coadjuvant resin is generally needed. For example, some epoxy resins such as low molecular weight epoxy resins; and also some polyester resins such as low molecular weight polyester resins and/or hydroxyl or carboxyl functional polyesters are not good film formers when used alone without crosslinker even though they are capable of reacting with the F group of the functional organosilane. This is usually because the resin alone cannot form a film by ambient air drying, heat fusing or heat curing. In these instances a crosslinking resin such as an aminoplast resin or some other resin having functional groups capable of reacting with the adjuvant resin can be used. It should be noted that as used herein an adjuvant resin can be a single resin or mixture of resins including a mixture with a crosslinking adjuvant. When a mixture of resins is used at least one of them should be adapted t react with the group represented by F in formula I for the functional organosilane. The important point to note is that the adjuvant resin be adapted to form a film as this is understood and appreciated by those skilled in the art of polymer chemistry.

Preferably the adjuvant resin is selected from the group consisting of acrylic resins, polyepoxide resins and mixtures thereof. More preferably the adjuvant resin is an acrylic resin.

The acrylic resin can be thermoplastic or thermosetting. In one embodiment, the thermoplastic resins are preferred for use herein. Suitable thermoplastic acrylic resins include polymers and copolymers of acrylic acid or methacrylic acid esters, for example, polymers and copolymers of esters formed by the reaction of acrylic or methacrylic acid with suitable alcohols such as methyl alcohol, ethyl alcohol, propyl alcohol, butyl alcohol and 2-ethylhexyl alcohol. One preferred thermoplastic acrylic resin is a copolymer of methyl methacrylate and ethyl acrylate. Suitable thermosetting acrylic resins include polymers and copolymers of acrylic monomers containing active hydrogens such as the hydroxyalkyl esters of ethylenically unsaturated carboxylic acids and at least one other copolymerizable ethylenically unsaturated monomer. For example, a suitable thermosetting resin is that prepared from 2-hydroxyethyl acrylate, acrylic acid, N-butoxymethyl acrylamide and another copolymerizable ethylenically unsaturated monomer such as styrene, vinyl toluene, methyl styrene or ethyl styrene. The amount of adjuvant resin typically ranges from about 5 percent by weight to about 95 percent by weight, preferably from about 10 percent to about 50 percent by weight, the percentages based on the total weight of the resinous components of the composition.

Examples of other resins which are suitable as adjuvant or coadjuvant resins include polyester resins and aminoplast resins which have been mentioned above. These are described in detail below along with polyepoxide resins which have been mentioned above as being suitable.

Polyester resins are generally formed by the esterification of polyols with polycarboxylic acids or acid anhydrides. The polyols conventionally employed include alkylene glycols, such as ethylene glycol, propylene glycol, butylene glycol and neopentyl glycol, and other glycols such as hydrogenated bisphenol A, cyclohexanedimethanol, caprolactone-diol reaction products, hydroxyalkylated bisphenols, polyether glycols, e.g., poly(oxytetramethylene) glycol, and similar type compounds. Other diols of various types and polyols of higher functionality can also be used. Such higher polyols include trimethylolpropane, trimethylolethane, pentaerythritol and higher molecular weight polyols, such as obtained by the reaction product of ethylene oxide and trimethylolpropane and various hydrolyzed epoxide resins.

Suitable carboxylic acids used in the reaction with the above-described polyols include phthalic, isophthalic, terephthalic, tetrahydrophthalic, hexahydrophthalic, adipic, azelaic, sebacic, maleic, glutaric, chlorendic, tetrachlorophthalic, maleic fumaric, itaconic, malonic, 2-methylsuccinic, 3,3-diethylglutaric, 2,2-dimethylsuccinic acid and trimellitic acid. Anhydrides of these acids where they exist can also be employed and are encompassed by the term "carboxylic acid".

The epoxide resins are those compounds having a 1,2-epoxy group, i.e.,

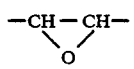

present in the molecule. Hydroxyl groups may also be present and often are. Polyepoxides contain more than one 1,2-epoxy group per molecule.

One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)-1,1-isobutane; 4,4-dihydrobenzophenone; bis(4,4-hydroxyphenyl)-1,1-ethane; bis(2-hydroxynaphenyl)-methane; and 1,5-hydroxynaphthalene. One very common polyepoxide is a polyglycidyl ether of a polyphenyl, such as bisphenol A.

Another class of epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Aminoplast resins are based on the addition products of formaldehyde, with an amino- or amido-group carrying substance. Condensation products obtained from the reaction of alcohols and formaldehyde with melamine, urea or benzoguanamine are most common and preferred herein. These condensation products can be monomeric or polymeric. Condensation products of other amines and amides can also be employed, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, glycoluril, ammelin, 2-chloro-4,6-diamino-1,3,5-triazine, 6-methyl-2,4-diamino-1,3,5-triazine, 3,5-diaminotriazole, triaminopyrimidine, 2-mercapto-4,6-diamino pyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as CELLOSOLVES and CARBITOLS, and halogen-substituted or other substituted alcohols, such as 3-chloropropanol and butoxyethanol. The preferred aminoplast resins are substantially alkylated with methanol or butanol.

As was mentioned above, the adjuvant resin is one which is capable of forming a film, and adapted to react with the functional group represented by F in formula I, above, for the functional organosilane. As is appreciated by those skilled in the art of polymer chemistry, to achieve optimum film properties the resins present in the coating composition are preferably compatible with each other.

The claimed coating compositions can be pigmented or unpigmented including clear coating compositions. For the purposes of the present application, the term "clear coating composition" refers not only to coating compositions which are unpigmented, but also to those coating compositions which contain transparent pigments and/or dyes. Suitable pigments for use herein include carbon black, titanium dioxide, talc, zinc oxide, magnesium oxide and magnesium carbonate. Organic pigments can also be utilized as well as metallic pigments. Mixtures of pigments can also be utilized.

The coating compositions of the present invention are preferably organic solvent-based coating compositions and as such can be formulated with a variety of organic solvents such as dimethyl phthalate, the mono- and dialkyl ethers of ethylene and propylene glycol such as ethylene glycol monoethyl ether, ethylene glycol monobutyl ether, ethylene glycol dibutyl ether, ethylene glycol monoethylether acetate, ethylene glycol monohexylether acetate, propylene glycol monoethylether; mono and dialkyl ethers of diethylene glycol such as diethylene glycol monoethylether and diethylene glycol diethylether; hydrocarbons such as toluene and xylene and mixtures thereof.

The coating compositions of the present invention can also contain a variety of conventional additives such as flow control agents and ultraviolet light absorbers.

The claimed coating compositions are particularly suitable for use as direct coatings to glass substrates. By glass substrate is meant not only glass but also a variety of ceramic-type materials such as Porcelain and ceramic frit coated glass. The claimed coating compositions can also be applied to a variety of other substrates including metals, paper, plastics and wood. The coatings can be applied by a variety of methods including spraying, brushing, dipping and roll coating. The claimed coating compositions are preferably one-package compositions.

The coating compositions of the present invention can be cured by baking at elevated temperatures within the range of from about 175° C. to about 275° C., preferably from about 230° C. to about 260° C., and more preferably from about 240° C. to about 250° C. When an appropriate fluoropolymer is selected, the claimed coating compositions can also be air dryed at ambient temperatures. The films are usually tack free in 30 to 60 minutes and thereafter dry completely in about 8 to 24 hours. The coating compositions can also be force dried. The term "cured" as used herein includes baking, air drying, force drying or any combination of these.

Also provided in accordance with the present invention is a method of forming a protective coating on a glass substrate comprising:
 (a) applying to the glass substrate a coating composition as has been described in detail above;
 (b) allowing the coating composition to cure.

It should be understood that the coating composition applied directly to the glass substrate can be pigmented or unpigmented as discussed above. Preferably, as has been indicated above, it is organic solvent based. In preferred embodiments of the claimed method, there is additionally applied over the basecoat a further coat of an organic solvent based coating composition. This additional coating can also be pigmented or unpigmented as desired. Preferably the additional coat is a fluoropolymer based coating composition and more preferably it is the claimed fluoropolymer based coating composition which has been described in detail above. In the embodiment wherein the second coating applied over the initial basecoat is a pigmented coating composition it is preferred to apply over said pigmented composition a clear organic solvent-based coating composition. The clearcoat utilized is preferably a claimed fluoropolymer based coating composition which has been detailed above. In this preferred three-coat method, it is preferred that the basecoat composition which is applied directly to glass is a composition which contains fluoropolymer, functional organosilane and acrylic adjuvant resin. Also provided in accordance with the present invention are the coated articles prepared according to the various embodiments of the method described above.

The coating compositions of the present invention are particularly desirable and advantageous in that they have excellent adhesion direct to glass, as well as the excellent weathering properties, chalk resistance and craze resistance associated with fluoropolymer compositions.

The following examples are illustrative of the invention and are not intended to limit it.

EXAMPLE I

This example illustrates the preparation and evaluation of several coating compositions according to the present invention. Each coating composition was prepared using a different functional organosilane. The formulated base mix for each composition as well as each silane are detailed below. The control composition contained no silane. Also shown is a comparative example utilizing a nonfunctional organosilane.

Base Mix

The base mix for each composition was a black pigmented, fluoropolymer and acrylic-based coating composition which was prepared from 15.92 percent black pigment; 29.24 percent binder made up of 70 percent polyvinylidene fluoride commercially available from Pennwalt as KYNAR ® 500 and 30 percent thermoplastic acrylic resin which was a copolymer of ethyl acrylate and methyl methacrylate commercially available from Rohm and Haas as ACRYLOID ® B-44 and 54.84 percent of a solvent blend containing 26.76 percent toluene, 19.94 percent ethylene glycol monoethyl ether acetate, 21.20 percent xylene, 17.99 percent ethylene glycol monobutyl ether acetate, 13.58 percent dimethyl phthalate and 0.53 percent denatured ethanol.

| | Functional Organosilanes |
|---|---|
| Trade Name | Chemical Name |
| UNION CARBIDE ® A-174 silane | gamma-methacryloxypropyltrimethoxy silane |
| UNION CARBIDE ® A-171 silane | vinyltrimethoxysilane |
| UNION CARBIDE ® A-187 silane | gamma-glycidoxypropyltrimethoxy silane |
| UNION CARBIDE ® A-189 silane | gamma-mercaptopropyltrimethoxy silane |
| UNION CARBIDE ® A-1100 silane | gamma-aminopropyltriethoxy silane |

All of the aforesaid silanes were commercially available from Union Carbide under the designated tradename. The nonfunctional organosilane which was used in the comparative coating composition was UNION CARBIDE ® A-163 which was also commercially available from Union Carbide and was methyl trimethoxysilane.

| | COATING COMPOSITIONS | | | | | | |
|---|---|---|---|---|---|---|---|
| | Compar- | Parts per Weight (grams) | | | | | |
| Ingredients | ative | A | B | C | D | E | F |
| basemix | 200 | 200 | 200 | 200 | 200 | 200 | 200 |
| A-174 | | 2.92 | | | | | |
| A-171 | | | 2.92 | | | | |
| A-187 | | | | 2.92 | | | |
| A-189 | | | | | 2.92 | | |
| A-1100 | | | | | | 2.92 | |
| Control (contained no silane) | | | | | | | — |
| A-163 (comparative) | 2.92 | | | | | | |

Each of the coating compositions was prepared by combining the ingredients with mild agitation. Each of the compositions was then applied to a clean, dry, glass substrate measuring 4 inches (9.16 cm)×12 inches (30.48 cm) using a 5-mil-drawbar. The silanes were present in the compositions at 5 percent solids based on the resin solids of the composition. The coated glass substrates were cured by baking for 10 minutes at 475° F. (246° C.).

The coated glass substrates were then evaluated for adhesion of the coating to the glass. The coatings were evaluated for adhesion to the glass panels after immersion in deionized water at ambient temperature for 15 minutes, i.e., 15 min. H₂O soak; after immersion in boiling deionized water for 10 minutes, i.e., 10 min. boil H₂O soak; and after immersion in boiling deionized water for 30 minutes, i.e., 30 min. boil H₂O soak. Before immersion, each coated panel was crosshatched with a PAT crosshatcher from Paul N. Gardner Company, (11 parallel cuts were made one-tenth of an inch (0.254 cm) apart followed by parallel cuts one-tenth of an inch apart perpendicular to and on top of the first set. After the immersion was complete, the crosshatched area was tested for pick-off of the coating using PERMACEL 610 Cellophane tape which is commercially available from 3M Company. The pick-off was rated as follows:

5—excellent (no pick-off of coating);
4—up to about 10 percent of film was picked off;
3—from 10 to about 25 percent of film was picked off;
2—from 25 to about 50 percent of film was picked off;
1—from 50 to about 65 percent of film was picked off;
0—from 65 percent to total pick-off of film.

The adhesion ratings appear below in Table I.

TABLE I

| Coating Composition | Adhesion | | |
|---|---|---|---|
| | 15 Min. H$_2$O Soak | 10 Min. Boil H$_2$O Soak | 30 Min. Boil H$_2$O Soak |
| A | 5 | 5 | 3 |
| B | 5 | 3 | 2 |
| C | 5 | 5 | 5 |
| D | 5 | 2 | 2 |
| E | 5 | 5 | 5 |
| F (Control) | 0 | 0 | not done since 10 min. failed |
| Comparative | 0 | 0 | not done since 10 min. failed |

The data above demonstrates that the coating compositions containing the various functional organosilanes all had adhesion to glass, even under aggressive conditions. The control composition which contained no silane at all as well as the comparative composition which contained a nonfunctional organosilane adhered poorly to the glass under even the mild water soak conditions.

EXAMPLE II

This example illustrates the importance of the adjuvant resin to the adhesion of the claimed coating compositions. A coating composition without adjuvant resin was prepared from 95 parts by weight of a polyvinylidene fluoride grind (prepared by grinding, using ceramic beads, 1 part of KYNAR® 500 polyvinylidene fluoride in 2 parts of dimethyl phthalate) and 5 parts by weight of UNION CARBIDE® A-187 (gamma-glycidoxypropyl-trimethoxy silane).

The coating composition was applied to a clean, dry, glass substrate using a 5-mil drawbar and baked for 15 minutes at 475° F. (246° C.). The coated glass panel was then evaluated for adhesion as described above in Example I initially before any water soak and then after a 30-minute boiling deionized water soak. Initially, the coating was rated 4 for adhesion. After the 30-minute boiling water soak, the coating was rated 0 for total loss of adhesion.

EXAMPLE III

This example illustrates the preparation and evaluation of both clear and pigmented coating compositions according to the present invention utilizing a thermosetting acrylic resin as the adjuvant resin.

Clear Basemix

The clear basemix was prepared from 40.25 percent binder containing 47.4 percent of a thermosetting acrylic resin (prepared to an acid number of 8.2 from 8.9 percent N-butoxymethylolacrylamide, 62.1 percent methyl methacrylate, 26.5 percent ethyl acrylate and 2.5 percent methacrylic acid at 46 percent total solids in a blend of 3.3 percent butanol, 6.5 percent xylene, 6.8 percent toluene, 7.1 percent aromatic petroleum distillates, 20.7 percent ethylene glycol monobutyl ether and 55.6 percent isophorone), 5.04 percent of a polymeric methylated melamine formaldehyde condensate commercially available from Monsanto as RESIMINE 731, 47.4 percent of polyvinylidene fluoride (KYNAR® 500) and 0.13 percent para-toluenesulfonic acid; and 59.75 percent of a solvent blend containing 80.60 percent isophorone, 1.44 percent butanol, 7.94 percent ethylene glycol monobutyl ether, 2.75 percent toluene, 3.89 percent aromatic petroleum distillates, 2.41 percent xylene and 1.0 percent isopropanol.

Brown Basemix

The brown basemix was prepared from 16.74 percent pigment; 33.52 percent of the same binder of the clear basemix above; and 49.75 percent of the same solvent blend of the clear basemix.

| | Coating Compositions | | |
|---|---|---|---|
| | Parts by Weight (grams) | | |
| Ingredients | A | B | C |
| clear basemix (control) | 40.0 | | |
| clear basemix | | 40.0 | |
| brown basemix | | | 40.0 |
| UNION CARBIDE® A-187 | 0 | 1.2 | 1.2 |

The functional organosilane was present in the coating compositions at a level of 5 percent solids based on resin solids of the composition. The coating compositions were prepared by combining the ingredients together with mild agitation. Each composition was drawn down onto clean, dry, glass substrates using a 7-mil drawbar. The coated panels were flashed for 10 minutes and then baked for 15 minutes at 475° F. (246° C.). The coatings were evaluated for adhesion as detailed in Example I above.

| Composition | Initial Adhesion Before Immersion | 30 Min. Boil H$_2$O Soak |
|---|---|---|
| A (control) | 4 | 0 |
| B | 5 | 5 |
| C | 5 | 5 |

The data above shows that the compositions of the present invention maintained adhesion after the water soak while the control exhibited total loss of adhesion.

EXAMPLE IV

This example illustrates the preparation of a coating composition according to the present invention wherein the adjuvant resin and the functional organosilane were provided by a single material.

| Ingredients | Parts by Weight (grams) |
|---|---|
| basemix[1] | 73.5 |
| acrylic-silane[2] | 24.2 |

-continued

| Ingredients | Parts by Weight (grams) |
| --- | --- |
| dimethyl phthalate | 3.1 |

[1] This basemix was a clear, fluoropolymer and acrylic based coating composition which was prepared from 43.98 percent binder made up of 90 percent polyvinylidene fluoride (KYNAR ® 500) and 10 percent thermoplastic acrylic resin (ACRYLOID ® B–44) and 56.02 percent of a solvent blend of 11.48 percent toluene, 18.40 percent dimethylphthalate, 20.42 percent ethylene glycol monobutyl ether acetate, 26.68 percent ethylene glycol monoethyl ether acetate and 23.01 percent xylene.
[2] This acrylic silane was prepared in the following manner:

| Charge | Ingredients | Parts by Weight (grams) |
| --- | --- | --- |
| I | butyl acetate | 448.0 |
|  | VM & P Naphtha | 192.0 |
|  | toluene | 128.0 |
| II | methyl methacrylate | 1152.0 |
|  | butyl methacrylate | 384.0 |
|  | UNION CARBIDE ® A-174 silane | 384.0 |
| III | butyl acetate | 224.0 |
|  | VAZO-67[a] | 48.0 |
| IV | butyl acetate | 224.0 |
|  | UNION CARBIDE ® A-189 silane | 96.0 |
| V | butyl acetate | 32.0 |
|  | VAZO-67 | 7.68 |
| VI | butyl acetate | 32.0 |
|  | VAZO-67 | 7.68 |

[a] This is 2,2'-azobis(2-methylisoburyronitrile), commercially available from E. I. duPont deNemours.

A suitably equipped reactor vessel was charged with (I) and heated to reflux. Subsequently, Charges (II), (III) and (IV) were added continuously from separate addition funnels over a period of two hours. Once the addition was complete, Charge (V) was added and the reaction mixture was held for one hour at reflux followed by the addition of (VI) and a one and one-half hour hold. The reaction mixture was then cooled and poured out. The resultant product had a total solids content of 59.77 percent determined at 110° C. for one hour and viscosity of 3.4 stokes. The resultant product had a number average molecular weight of 4886 as determined by gel permeation chromatography using a polystyrene standard.

The resultant coating composition had a polyvinylidene fluoride content of 70 percent, a thermoplastic acrylic resin content of 8 percent and an acrylic-silane content of 22 percent (the silane content of this resin was 4.4 percent based on resin solids).

The coating composition was applied to glass panels using a 5-mil drawbar as described above and baked for 10 minutes at 475° F. (246° C.). The resultant coating showed no mar resistance improvement but passed 30 minutes of boiling water immersion.

EXAMPLE V

This example illustrates the preparation and evaluation of various multicoated substrates according to the present invention.

A coating composition according to the present invention was applied directly to several glass substrates of the dimensions detailed in Example I, above, as a primer. Some of the panels were then coated with a conventional organic solvent based fluoropolymer and acrylic based topcoat and others were topcoated with a fluoropolymer based coating composition of the present invention. Selected panels were then coated with a further organic solvent based fluoropolymer and acrylic based clear coating composition. The control panels were coated in identical fashion except that the primer composition applied directly to the glass substrates was a conventional fluoropolymer and acrylic primer composition rather than a composition of the present invention. The coated glass substrates were then evaluated for adhesion. The details of the compositions and mode of application are set out below.

Coating Compositions

Composition A: Control Primer

The control primer was a yellow pigmented, fluoropolymer and acrylic based coating composition which was prepared from 26.84 percent pigment; 23.22 percent binder made up of 50.08 percent polyvinylidene fluoride (KYNAR® 500), 37.95 percent ACRYLOID® B44 thermoplastic acrylic resin and 11.98 percent polyepoxide resin commercially available from Shell as EPON 1001; and 49.94 percent of a solvent blend containing 36.39 percent toluene, 17.14 percent dimethyl phthalate, 19.57 percent ethylene glycol monobutyl ether acetate, 13.47 percent ethylene glycol monoethyl ether acetate and 1.39 percent of n-butyl acetate.

Composition B: Primer According to Claimed Invention

This coating composition was prepared by combining together with agitation 107 grams of the control primer composition A, above, with 1.9 grams of UNION CARBIDE ® A-187 silane.

Composition C: Control Pigmented Topcoat

This was the basemix detailed above in Example I.

Composition D: Pigmented Topcoat According to Present Invention

This coating composition was prepared by combining 100 grams of the control composition C and 1.5 grams of UNION CARBIDE ® A-187 silane.

Composition E: Clear Coating Composition

This unpigmented coating composition was prepared from 38.03 percent binder made up of 70 percent polyvinylidene fluoride (KYNAR ® 500) and 30 percent ACRYLOID ® B44 thermoplastic acrylic resin; and 61.97 percent of a solvent blend containing 30.32 percent toluene, 18.70 percent xylene 15.31 percent dimethyl phthalate, 16.18 percent ethylene glycol monobutyl ether acetate and 19.46 percent of ethylene glycol monoethyl ether acetate.

The primer compositions were spray applied at a dry film thickness of 0.2 to 0.5 mil. The topcoats and clearcoats were applied wet on wet, the topcoats at a dry film thickness of 0.8 to 1.0 mil and the clearcoats at a dry film thickness of 0.2 to 0.5 mil. The compositions were then baked at 475° F. (246° C.) for 10 minutes and evaluated for adhesion as detailed above both initially and after 30 minutes immersion in boiling deionized water.

The multicoat systems and the results are set out below.

| Substrate Number | Primer Composition | Topcoat Composition | Clearcoat Composition | Initial Adhesion | Adhesion 30 min $H_2O$ Boil |
| --- | --- | --- | --- | --- | --- |
| 1 | Control (A) | none | none | 4 | 0 |
| 2 | Control (A) | Control (C) | none | 5 | 1 |

| Substrate Number | Primer Composition | Topcoat Composition | Clearcoat Composition | Initial Adhesion | Adhesion 30 min H₂O Boil |
|---|---|---|---|---|---|
| 3 | B | D | none | 5 | 5 |
| 4 | B | Control (C) | none | 5 | 5 |
| 5 | B | D | E | 5 | 5 |
| 6 | B | Control (C) | E | 5 | 4+ |

As the data above demonstrates, the multicoated glass substrates prepared with a control primer direct to glass had a very poor adhesion after boiling water immersion. The multicoated glass substrates prepared with a primer composition according to the present invention, using either a control topcoat or a topcoating composition according to the present invention, had excellent adhesion after boiling water immersion.

EXAMPLE VI

This example illustrates that the adjuvant resin of the claimed coating compositions must be adapted to react with the functional organosilane.

| Ingredients | A Parts by Weight (grams) | B Parts by Weight (grams) |
|---|---|---|
| polyvinylidene fluoride in dimethyl phthalate[3] | 257.6 | 257.0 |
| polyester resin[4] | 25.0 | 25.0 |
| UNION CARBIDE ® A-187 silane | 5.0 | 0 |

[3]This was a 33 percent solids dispersion of KYNAR 500 in dimethyl phthalate.
[4]This polyester resin was prepared at 60 percent solids in a solvent blend of 85 percent toluene, 12 percent ethylene glycol monobutyl ether and 3 percent ethyl benzene from 38.1 percent of ESTER DIOL 204 commercially available from Union Carbide, 44.2 percent isophthalic acid and 17.7 percent trimethylolpropane.

The coating compositions were drawn down with a 5-mil drawbar on clean glass panels and baked for 15 minutes at 475° F. (246° C.). The panels were tested for adhesion as has been detailed above in Example I, initially after baking, after ambient water soak and after boiling water immersion for 30 minutes. Since the polyester is a film-former (as evidenced by drawing the resin down on a glass panel and baking for 15 minutes at 475° F. (246° C.), it is believed that the adhesion was not good because the polyester adjuvant did not have functionality to react with the functional organosilane. The adhesion of the coating with the silane was almost as poor as the control without any silane. The results are set out below.

| Composition | Dry Film Thickness (mils) | Dry Adhesion | Adhesion After 5 minutes Ambient H₂O Soak | Adhesion After 30 minutes Boiling H₂O Soak |
|---|---|---|---|---|
| A | 1.1 | 3 | 2— | 0 |
| B | 1.1 | 2 | 0 | 0 |

EXAMPLE VII

This example illustrates that some adjuvant resins are not good film formers when used alone and require a coadjuvant as crosslinker to achieve good adhesion, even though the adjuvant has functionality adapted to react with the functional organosilane.

| Ingredients | A Parts by Weight (grams) | B Parts by Weight (grams) |
|---|---|---|
| polyvinylidene fluoride in dimethyl phthalate[5] | 100.0 | 500.0 |
| acid functional polyester adjuvant[6] | 47.14 | 47.14 |
| UNION CARBIDE ® A-187 silane | 1.65 | 4.09 |
| EPON 828 as crosslinker | 0 | 48.88 |

[5]Described in footnote (3), above.
[6]This acid functional polyester had an acid value of 76.4 and was prepared at 70 percent solids in a solvent blend of 90 percent methyl isobutyl ketone and 10 percent ethanol. The polyester was prepared from 25.8 percent dibasic ester, 21.7 percent 1,6-hexanediol, 12.2 percent cyclohexane dimethanol, 8.8 percent trimethyl diisocyanate and 31.5 percent methyl hexahydrophthalic anhydride.

The coating compositions were applied with a 5 mil drawbar on clean, glass substrates and baked for 15 minutes at 475° F. (246° C.). The coatings were evaluated for dry adhesion, and adhesion after 10 minutes and 30 minutes boiling water immersion as detailed in Example I, above. The coating having a coadjuvant crosslinker for the polyester resin adjuvant exhibited better adhesion than the coating without crosslinker. The results are set out below.

| Composition | Dry Film Thickness | Dry Adhesion | 10 min. H₂O Boil | 30 min. H₂O Boil |
|---|---|---|---|---|
| A | 1.2 | 4 (tacky) | 1 | 0 |
| B | 1.3 | 5 | 5 | 5—(slightly tacky) |

What is claimed is:
1. A coating composition, comprising a fluoropolymer, a film forming adjuvant resin which is different from the fluoropolymer and adapted to react with the group represented by F in the functional organosilane of formula I and which is selected from the group consisting of acrylic resins, polypoxide resins, polyester resins, aminoplast resins and mixtures thereof; and an amount effective to promote adhesion of a functional organosilane represented by formula I:

$$F-G-\underset{X_{3-b}}{\overset{A_b}{Si}}$$  (I)

wherein
A represents an organo group containing from 1 to 18 carbon atoms,
G represents an organo group containing from 2 to 10 carbon atoms,
X represents a hydrolyzable group,
b is an integer from 0 to 2, and
F represents amino, polyamino, epoxy, glycidoxy, mercapto, cyano, allyl, vinyl, urethano, halo, isocyanato, ureido, imidazolinyl, acrylato or methacrylato.

2. The coating composition of claim 1 wherein the hydrolyzable group X represents $-OR^1$,

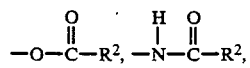

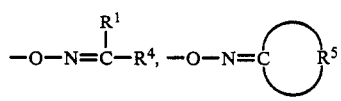

and the monohydroxy cyclic $C_2$-$C_3$ residue of a 1,2- or 1,3-glycol, wherein $R^1$ represents $C_1$-$C_3$ alkyl,
$R^2$ independently represents H or $C_1$-$C_4$ alkyl,
$R^3$ and $R^4$ independently represent H, $C_1$-$C_4$ alkyl or $C_6$-$C_8$ aryl, and
$R^5$ represents $C_4$-$C_7$ alkylene.

3. The coating composition of claim 1 wherein the adjuvant resin is selected from the group of thermoplastic acrylic resins, thermosetting acrylic resins, polyepoxide resins and mixtures thereof.

4. The coating composition of claim 3 wherein the adjuvant resin is a thermoplastic acrylic resin.

5. The coating composition of claim 3 wherein the adjuvant resin is a thermosetting acrylic resin.

6. The coating composition of claim 3 wherein the adjuvant resin is a mixture of a thermoplastic acrylic resin and a polyepoxide resin.

7. The coating composition of claim 1 wherein the F group of the functional organosilane is an epoxy group.

8. The coating composition of claim 7 wherein the silane is a gamma-glycidoxypropyltrialkoxy silane.

9. The coating composition of claim 1 wherein the F group is amino or polyamino.

10. The coating composition of claim 4 wherein the thermoplastic acrylic resin is a copolymer of methyl methacrylate and ethyl acrylate.

11. The coating composition of claim 1 wherein the F group is vinyl.

12. The coating composition of claim 6 wherein the polyepoxide resin is a polyglycidyl ether of a polyphenol.

13. The coating composition of claim 1 wherein the silane is present in an amount of at least 0.1 percent based on resin solids.

14. The coating composition of claim 13 wherein the silane is present in the amount of at least 2 percent based on resin solids.

15. The coating composition of claim 13 wherein the silane is present in an amount ranging from about 0.1 percent to about 15 percent based on resin solids.

16. The coating composition of claim 4 wherein the fluoropolymer is present in an amount ranging from about 5 percent to about 65 percent based on resin solids and the acrylic resin is present in an amount ranging from about 5 percent to about 95 percent based on resin solids.

17. The coating composition of claim 6 wherein the fluoropolymer is present in an amount ranging from about 50 to about 70 percent, the acrylic resin is present in an amount ranging from about 10 percent to about 40 percent and the polyepoxide is present in an amount ranging from about 5 percent to about 15 percent, the percentages based on resin solids.

18. A method of forming a decorative coating on a glass substrate comprising:
(a) applying to the glass substrate a coating composition comprising a fluoropolymer, a film-forming adjuvant resin which is different from the fluoropolymer and adapted to react with the group represented by F in the functional organosilane of formula I and which is selected from the group consisting of acrylic resins, polyepoxide resins, polyester resins, aminoplast resins and mixtures thereof; and an amount effective to promote adhesion of a functional organosilane represented by formula I:

wherein

A represents an organo group consisting from 1 to 18 carbon atoms,
G represents an organo group containing from 2 to 10 carbon atoms,
X represents a hydrolyzable group;
b is an integer from 0 to 2, and
F represents amino, polyamino, epoxy, glycidoxy, mercapto, cyano, allyl, vinyl, urethano, halo, isocyanato, ureido, imidazolinyl, acrylato or methacrylato.

(b) allowing the coating composition to cure.

19. The method of claim 18 additionally comprising the step of applying over the composition of (a) a second coat of an organic solvent based coating composition.

20. The method of claim 19 wherein the organic solvent based coating composition is a pigmented composition.

21. The method of claim 19 wherein the organic solvent based coating composition is an unpigmented composition.

22. The method of claim 20 wherein the coating composition is a fluoropolymer based coating composition.

23. The method of claim 22 additionally comprising the step of applying over the pigmented composition an unpigmented organic solvent based coating composition.

24. The method of claim 17 wherein X represents $OR^1$

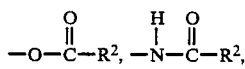

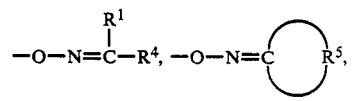

and the monohydroxy or cyclic $C_2$-$C_3$ residue of a 1,2- or 1,3-glycol, wherein $R^1$ represents $C_1$-$C_3$ alkyl,
$R^2$ independently represents H or $C_1$-$C_4$ alkyl,
$R^3$ and $R^4$ independently represent H, $C_1$-$C_4$ alkyl or $C_6$-$C_8$ aryl, and
$R^5$ represents $C_4$-$C_7$ alkylene.

25. The method of claim 20 wherein the pigmented coating composition is an organic solvent based coating composition, comprising a fluoropolymer, and a film-forming adjuvant resin which is different from the fluoropolymer and adapted to react with the group represented by F in the functional organosilane of formula I; and an amount effective to promote adhesion of a functional organosilane represented by formula I:

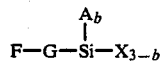

wherein
- A represents an organo group containing from 1 to 18 carbon atoms,
- G represents an organo group containing from 2 to 10 carbon atoms,
- X represents a hydrolyzable group;
- b is an integer from 0 to 2, and
- F represents amino, polyamino, epoxy, glycidoxy, mercapto, cyano, allyl, vinyl, urethano, halo, isocyanato, ureido, imidazolinyl, acrylato, or methacrylato.

26. The method of claim 21 wherein the unpigmented coating composition is an organic solvent based coating composition, comprising a fluoropolymer, a film-forming adjuvant resin which is different from the fluoroplymer and adapted to react with the group represented by F in the functional organosilane of formula I; and an amount effective to promote adhesion of a functional organosilane represented by formula I:

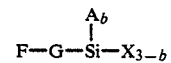

wherein
- A represents an organo group containing from 1 to 18 carbon atoms,
- G represents an organo group containing from 2 to 10 carbon atoms,
- X represents a hydrolyzable group;
- b is an integer from 0 to 2, and
- F represents amino, polyamino, epoxy, glycidoxy, mercapto, cyano, allyl, vinyl, urethano, halo, isocyanato, ureido, imidazolinyl, acrylato or methacrylato.

27. A coated article according to claim 18.
28. A coated article according to claim 19.
29. A coated article according to claim 20.
30. A coated article according to claim 23.

* * * * *